(12) United States Patent
Kawauchi et al.

(10) Patent No.: US 11,390,506 B2
(45) Date of Patent: Jul. 19, 2022

(54) POSITION CALCULATION SYSTEM, POSITION CALCULATION METHOD, AND AUTOMATED GUIDED VEHICLE

(71) Applicant: MITSUBISHI HEAVY INDUSTRIES, LTD., Tokyo (JP)

(72) Inventors: Naoto Kawauchi, Tokyo (JP); Noriyuki Hasegawa, Tokyo (JP); Kensuke Futahashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 247 days.

(21) Appl. No.: 16/792,991

(22) Filed: Feb. 18, 2020

(65) Prior Publication Data
US 2021/0039931 A1 Feb. 11, 2021

(30) Foreign Application Priority Data
Aug. 8, 2019 (JP) .............................. JP2019-145963

(51) Int. Cl.
*B66F 9/075* (2006.01)
*B66F 9/06* (2006.01)
(Continued)

(52) U.S. Cl.
CPC ............ *B66F 9/0755* (2013.01); *B66F 9/063* (2013.01); *G05D 1/0027* (2013.01); *G05D 1/0248* (2013.01); *G05D 2201/0216* (2013.01)

(58) Field of Classification Search
CPC ..... B66F 9/0755; B66F 9/063; G05D 1/0027; G05D 1/0248; G05D 2201/0216; G05D 1/0236
See application file for complete search history.

(56) References Cited

U.S. PATENT DOCUMENTS 6,246,930 B1  6/2001 Hori
6,259,979 B1 * 7/2001 Holmquist ........... G05D 1/0236
                                                         701/23
(Continued)

FOREIGN PATENT DOCUMENTS

JP      08-110815      4/1996
JP      2000-56829     2/2000
(Continued)

*Primary Examiner* — Tyler J Lee
*Assistant Examiner* — Yufeng Zhang
(74) *Attorney, Agent, or Firm* — Wenderoth, Lind & Ponack, L.L.P.

(57) ABSTRACT

A position calculation system includes a managing unit managing a current position of a plurality of automated guided vehicles; and a position calculating unit calculating a position of the target automated guided vehicle based on a detection result, detected by the laser measuring device mounted on the target automated guided vehicle, of detecting each reflection light reflected from a specific number being two or more of reflection sources, position information of which is obtainable, existing at positions on mutually different directions viewing from the target automated guided vehicle. Here, when the reflection sources with the reflection light therefrom detected include a mounted reflection source mounted on another automated guided vehicle other than the target automated guided vehicle, the position calculating unit obtains the position information of the mounted reflection source based on the current position managed by the managing unit, and calculates a position of the target automated guided vehicle.

9 Claims, 9 Drawing Sheets

(51) Int. Cl.
*G05D 1/00* (2006.01)
*G05D 1/02* (2020.01)

(56) References Cited

U.S. PATENT DOCUMENTS

| | | | |
|---|---|---|---|
| 6,341,430 B1 * | 1/2002 | Carstens | G05D 1/0234 33/563 |
| 2016/0120095 A1 | 5/2016 | Fujimoto et al. | |
| 2016/0132059 A1 | 5/2016 | Mason et al. | |
| 2018/0113468 A1 | 4/2018 | Russell | |

FOREIGN PATENT DOCUMENTS

| JP | 2000-180528 | 6/2000 |
|---|---|---|
| JP | 2013-153280 | 8/2013 |
| JP | 2015-188351 | 11/2015 |

* cited by examiner

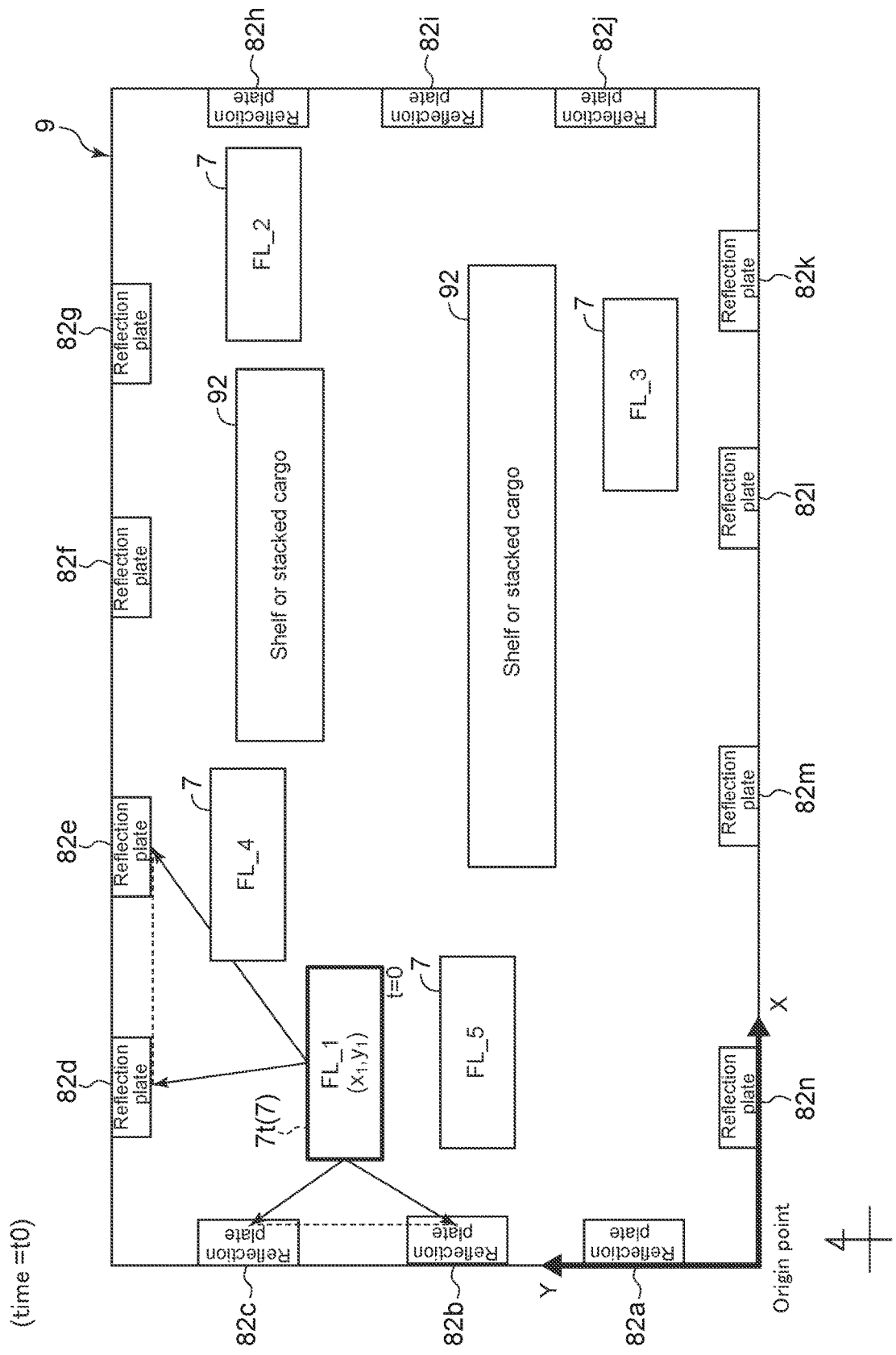

POSITION CALCULATION SYSTEM, POSITION CALCULATION METHOD, AND AUTOMATED GUIDED VEHICLE

TECHNICAL FIELD

This disclosure relates to a calculation method for a position of an automated guided vehicle.

BACKGROUND

There has been known a system with which an automated guided vehicle (AGV) travels to perform cargo conveying operation such as an automated guided forklift (AGF) detects a plurality of reflection plates arranged at mutually different positions therearound using a laser measuring device mounted on the own vehicle, and calculates a current position of the own vehicle (e.g., Patent Documents 1 and 2). For example, Patent Document 1 discloses an automated guided vehicle mounted with a laser measuring device (laser scanner) capable of detecting reflection light reflected from reflection plates (reflection sources) arranged at positions being apart from the own vehicle. Owing to that the measuring direction is varied while the laser measuring device is rotated, the current position of the own vehicle is acknowledged as specifying a possible combination of three or more of the reflection plates acknowledged (detected) in mutually different directions on a reflection plate map based on information of distances between the laser measuring device and the reflection plates.

CITATION LIST

Patent Literature

Patent Document 1: JP2000-56829A
Patent Document 2: JP-H8-110815A

SUMMARY

In a case that a position of an automated guided vehicle moving, for example, in a warehouse is to be measured with triangulation using a laser measuring device mounted on the automated guided vehicle, reflection sources to be detected by the laser measuring device are premised on that positions thereof are known as being arranged at a stationary entity such as a wall of the warehouse. However, there may be a case that the laser measuring device cannot detect the reflection source (stationary reflection source) arranged at the stationary entity owing to that an obstacle such as a shelf and a stacked cargo arranged in the warehouse or another automated guided vehicle exists between the laser measuring device and the reflection source. When a specific number of reflection sources necessary for calculating the position of the automated guided vehicle cannot be detected under the abovementioned situation and the like, position calculation of the automated guided vehicle cannot be performed and unmanned travelling fails. In view of such a problem, it is conceivable as a countermeasure to arrange stationary reflection sources and a laser measuring device at high positions to avoid an obstacle or to arrange many stationary reflection sources to be less likely to receive influence of an obstacle. However, such a countermeasure is laborious and costly.

In this regard, it is an object of at least one embodiment of the present invention to provide a position calculation system capable of calculating a position of an automated guided vehicle even in a case that a plurality of reflection sources each being arranged at a stationary entity at known positions cannot be detected.

(1) A position calculation system according to at least one embodiment of the present invention is a position calculation system to calculate a position of a target automated guided vehicle among a plurality of automated guided vehicles each mounted with a laser measuring device, including a managing unit configured to manage a current position of each of the plurality of automated guided vehicles; and a position calculating unit configured to calculate a position of the target automated guided vehicle based on a detection result, detected by the laser measuring device mounted on the target automated guided vehicle, of detecting each reflection light reflected from a specific number being two or more of reflection sources, position information of which is obtainable, existing at positions on mutually different directions viewing from the target automated guided vehicle. Here, when the specific number of reflection sources with the reflection light therefrom detected include a mounted reflection source mounted on another automated guided vehicle other than the target automated guided vehicle, the position calculating unit obtains the position information of the mounted reflection source based on the current position managed by the managing unit, and calculates a position of the target automated guided vehicle.

According to the configuration described above as (1), the reflection source (mounted reflection source) is mounted on each of the automated guided vehicles. When the specific number of the reflection sources detected around and by the laser measuring device mounted on the automated guided vehicle being the target of position calculation include the mounted reflection source of another automated guided vehicle, position calculation (measurement) of the target automated guided vehicle is performed, after the position information of the mounted reflection source that has been detected is obtained based on management information of the managing unit (current information), based on the position information of the specific number of the reflection sources including the known position information of the mounted reflection source. That is, in the position calculation system, it is configured that position calculation of the target automated guided vehicle is assisted by another automated guided vehicle. According to the above, even in a case that the specific number of the stationary reflection sources cannot be detected by the laser measuring device of the target automated guided vehicle, position calculation of the target automated guided vehicle can be performed by using the detection result of the mounted reflection source of another automated guided vehicle detected by the target automated guided vehicle (laser measuring device).

(2) In some embodiments, in the configuration described above as (1), the position calculating unit includes a detection result obtaining unit configured to obtain the detection result detected by the laser measuring device mounted on the target automated guided vehicle; a determining unit configured to determine whether the reflection source with the reflection light detected is the mounted reflection source or a stationary reflection source installed on a position-fixed stationary entity; and a first obtaining unit configured to obtain, from the managing unit, the position information of the reflection source that has been determined to be the mounted reflection source by the determining unit.

According to the configuration described above as (2), the determining unit determines the type of the detected reflection source as being whether the mounted reflection source or the stationary reflection source. Accordingly, the position calculating unit can appropriately obtain the position information of the mounted reflection source from the managing unit.

(3) In some embodiments, in the configuration described above as (2), the position calculation system further includes a memory unit configured to store the position information of each of a plurality of the stationary reflection sources installed at mutually different positions. Here, the position calculating unit further includes a second obtaining unit configured to obtain, from the memory unit, the position information of the reflection source that has been determined to be the stationary reflection source by the determining unit.

According to the configuration described above as (3), the position information of the plurality of stationary reflection sources are stored in the memory unit and the position calculating unit obtains, from the memory unit, the position information of the reflection source determined as being the stationary reflection source by the determining unit. Accordingly, the position calculating unit can appropriately obtain the position information of the detected stationary reflection source from the memory unit.

(4) In some embodiments, in the configuration described above as (2) or (3), the position calculating unit calculates a position of the target automated guided vehicle using the detection result of the reflection light reflected from the mounted reflection source when the reflection light reflected from each of the specific number of stationary reflection sources is not detected by the laser measuring device mounted on the target automated guided vehicle.

According to the configuration described above as (4), in the position calculation of the target automated guided vehicle, the detection result of the reflection light reflected from the mounted reflection source is used when the detection result of the reflection light reflected from the stationary reflection source does not satisfy the specific number. That is, the position of the target automated guided vehicle is calculated using, in a preferential manner, the detection result of the reflection light reflected from the stationary reflection source. In a case that the position information of a stationary reflection entity is more accurate than the position of the mounted reflection source that moves, it is possible to improve calculation accuracy of the target automated guided vehicle.

(5) In some embodiments, in the configuration described above as any one of (1) to (4), the position calculation system further includes a first instructing unit configured to instruct the other automated guided vehicle to move to a position at which the reflection light reflected from the mounted reflection source is capable of being detected by the laser measuring device mounted on the target automated guided vehicle, when the number of the reflection sources with the reflection light therefrom detected by the laser measuring device mounted on the target automated guided vehicle does not reach the specific number.

According to the configuration described above as (5), when the reflection lights reflected from the specific number of the reflection sources cannot be detected by the laser measuring device mounted on the target automated guided vehicle, the target automated guided vehicle is caused to be capable of detecting the reflection lights reflected from the specific number of the reflection sources by causing the other automated guided vehicle, for example, not in operation to move. Accordingly, it is possible to increase the possibility that the target automated guided vehicle detects the specific number of the reflection sources and to enhance assistance for the position calculation of the target automated guided vehicle by the other automated guided vehicle.

(6) In some embodiments, in the configuration described above as any one of (1) to (5), the position calculation system further includes a second instructing unit configured to instruct the target automated guided vehicle to stand by for moving or change a position calculation method, when the number of the reflection sources with the reflection light therefrom detected by the laser measuring device mounted on the target automated guided vehicle does not reach the specific number.

According to the configuration described above as (6), when the reflection lights reflected from the specific number of the reflection sources cannot be detected by the laser measuring device mounted on the target automated guided vehicle, the target automated guided vehicle is instructed to stand by for moving or change a position calculation method (position calculation logic). In a case, for example, that another automated guided vehicle cannot be moved to a position to be capable of being detected by the target automated guided vehicle, the stand-by instruction can prevent the target automated guided vehicle from moving without the position thereof acknowledged. Further, due to, for example, switching to a method requiring less number than the specific number by changing the position calculation method, the position calculation of the target automated guided vehicle can be continued.

(7) A position calculation method according to at least one embodiment of the present invention is a position calculation method to calculate a position of a target automated guided vehicle among a plurality of automated guided vehicles each mounted with a laser measuring device, including a managing step of managing a current position of each of the plurality of automated guided vehicles; and a position calculating step of calculating a position of the target automated guided vehicle based on a detection result, detected by the laser measuring device mounted on the target automated guided vehicle, of detecting each reflection light reflected from a specific number being two or more of reflection sources, position information of which is obtainable, existing at positions on mutually different directions viewing from the target automated guided vehicle. Here, the position calculating step includes obtaining the position information of the mounted reflection source based on the current position managed by the managing unit, and calculating a position of the target automated guided vehicle, when the specific number of reflection sources with the reflection light therefrom detected include a mounted reflection source mounted on another automated guided vehicle other than the target automated guided vehicle.

The configuration described above as (7) provides effects similar to those provided by the configuration described above as (1).

(8) An automated guided vehicle according to at least one embodiment of the present invention includes one or more mounted reflection sources capable of reflecting, toward a laser measuring device, laser radiated from the laser measuring device mounted on an automated guided vehicle being a target of position calculation for the position calculation system according to the configuration described above as any one of (1) to (6).

The configuration described above as (8) provides effects similar to those provided by the configuration described above as (1). Further, owing to that two or more reflection sources are mounted, it is possible to increase the possibility that the target automated guided vehicle can detect the reflection lights reflected from the specific number of reflection sources.

At least one embodiment of the present invention provides a position calculation system capable of calculating a position of an automated guided vehicle even in a case that a plurality of reflection sources each being arranged at a stationary entity at known positions cannot be detected.

BRIEF DESCRIPTION OF DRAWINGS

FIG. 3 is a view illustrating a position relation of a plurality of the automated guided vehicles according to an embodiment of the present invention in a warehouse at time t0.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For example, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same", "equal" and "uniform" shall not be construed as indicating only the state in which the feature is strictly equal, but also includes a state in which there is a tolerance or a difference that can still achieve the same function.

Further, for example, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
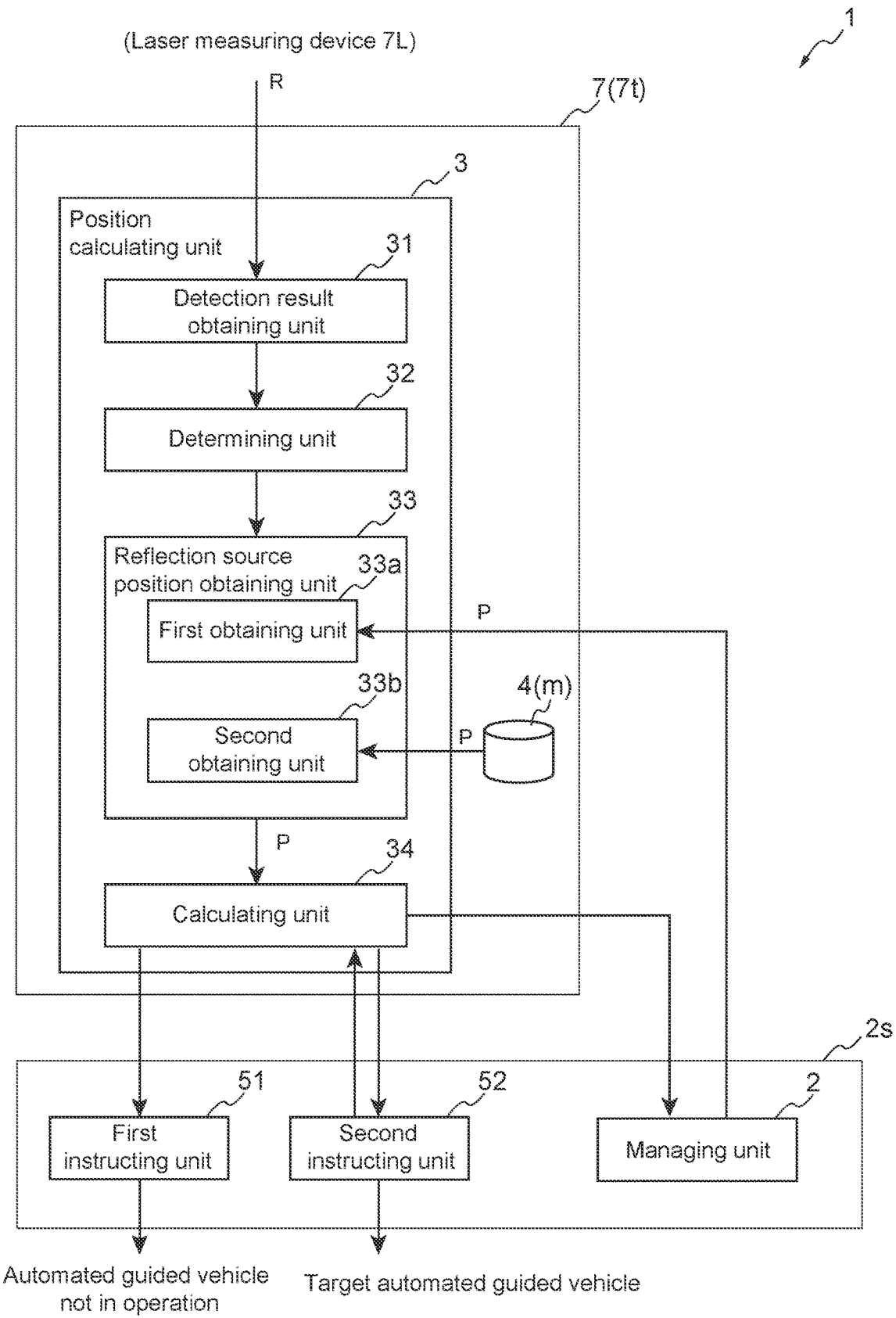
FIG. 1 is a view illustrating a position calculation system of an automated guided vehicle according to an embodiment of the present invention.
Figure 2A:
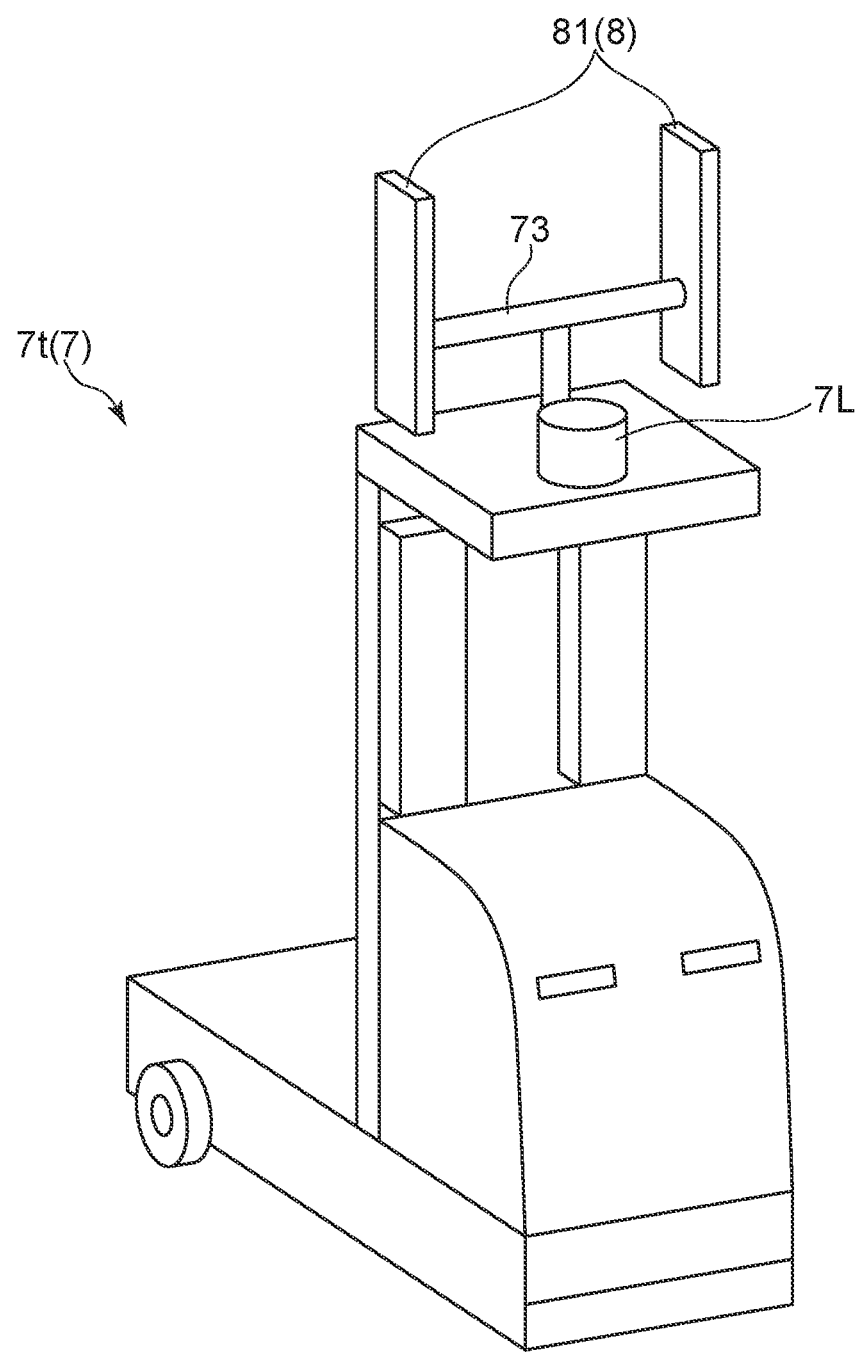
FIG. 2A is a view illustrating an automated guided vehicle, according to an embodiment of the present invention, with reflection sources mounted thereon and arranged as rising from an uppermost part thereof.
Figure 2B:
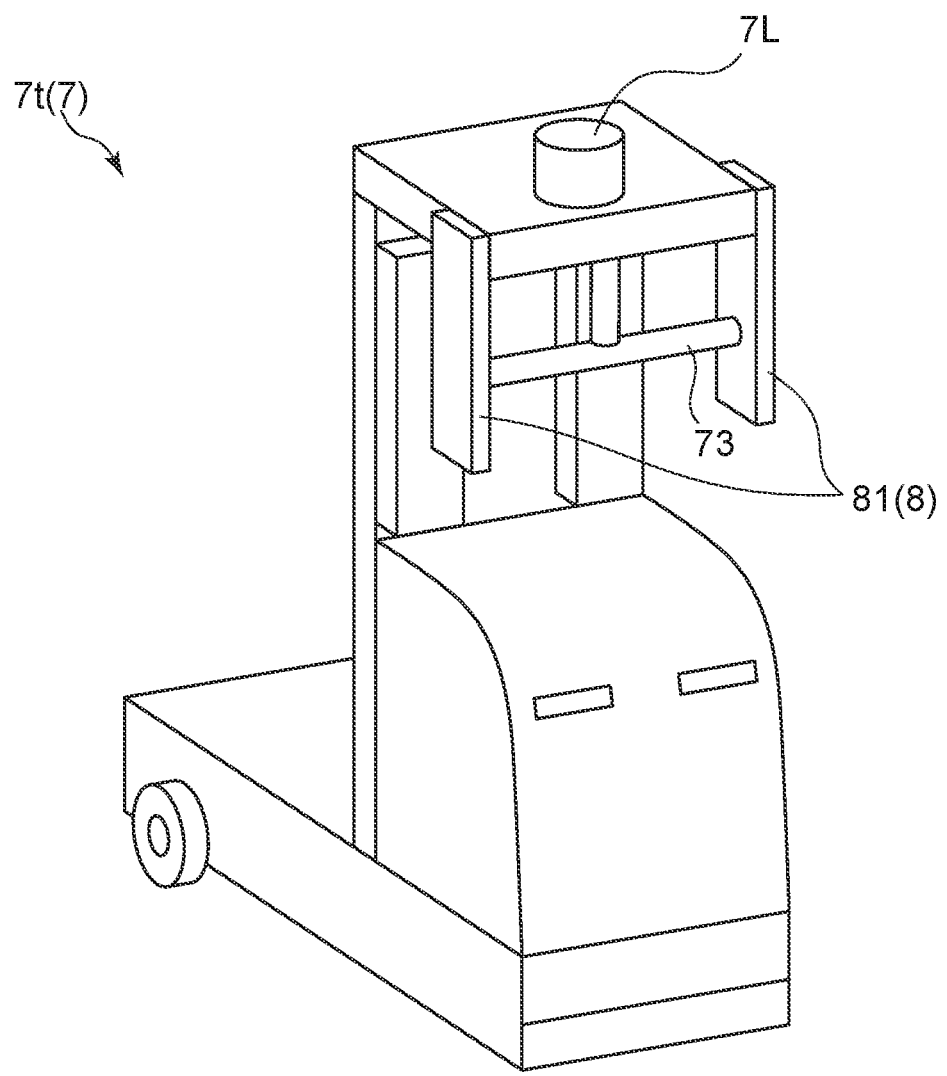
FIG. 2B is a view illustrating an automated guided vehicle, according to an embodiment of the present invention, with reflection sources mounted thereon and arranged as being hanged from an uppermost part thereof.
Figure 4:
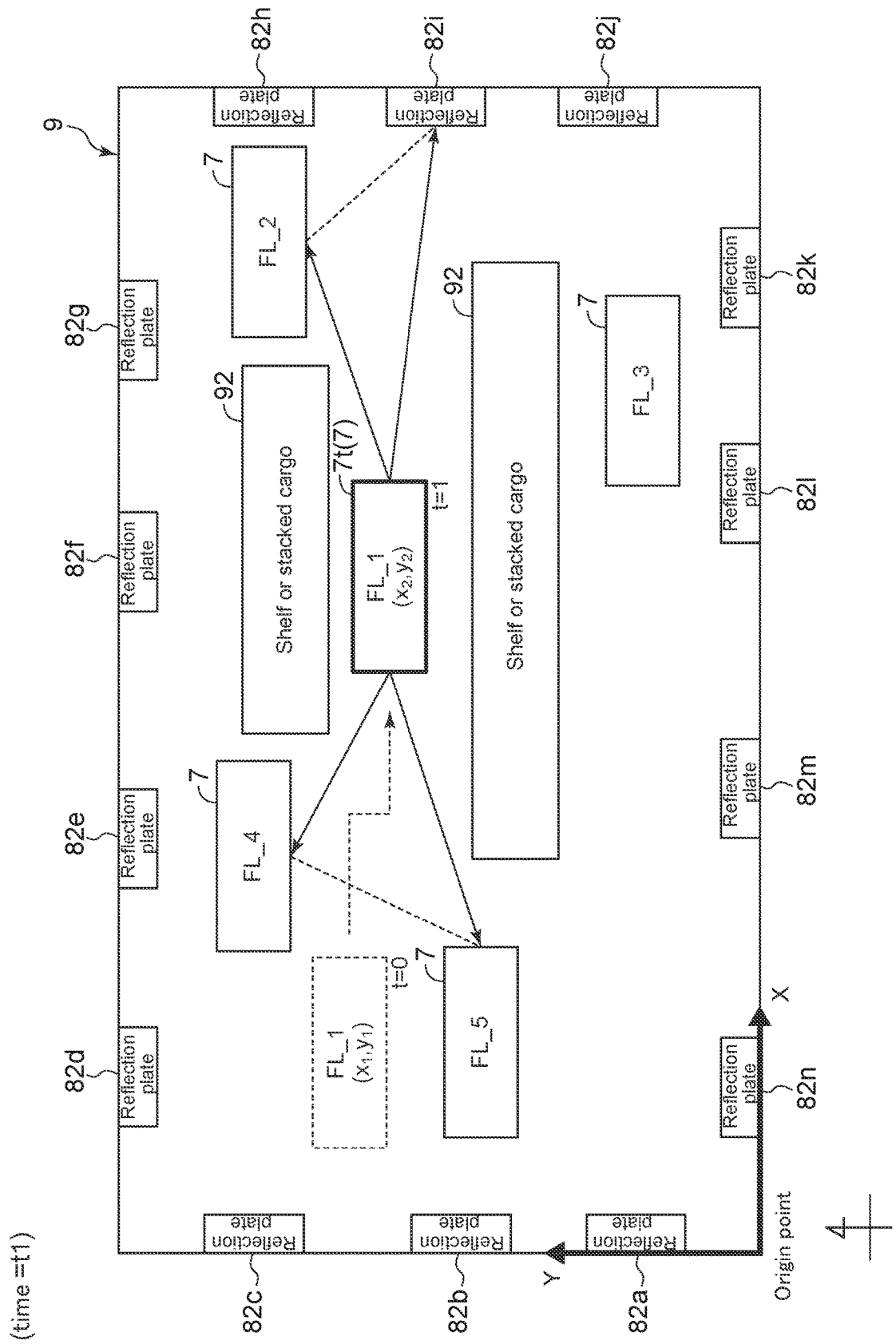
FIG. 4 is a view illustrating a position relation of a plurality of the automated guided vehicles according to an embodiment of the present invention in a warehouse at time t1.

FIG. 1 is a view illustrating a position calculation system of an automated guided vehicle (AGV) 7 according to an embodiment of the present invention. FIGS. 2A and 2B are views illustrating the automated guided vehicle 7 having a reflection source 8 mounted according to an embodiment of the present invention. FIG. 3 is a view illustrating a position relation of a plurality of the automated guided vehicles 7 according to an embodiment of the present invention in a warehouse 9 at time t0. FIG. 4 is a view illustrating a position relation of a plurality of the automated guided vehicles 7 according to an embodiment of the present invention in a warehouse 9 at time t1.

The position calculation system illustrated in FIG. 1 is a system (apparatus) for calculating a position of the automated guided vehicle 7 being a target for position calculation (measurement) (hereinafter, a target automated guided vehicle 7t) among a plurality of the automated guided vehicles 7 each mounted with a laser measuring device 7L. For calculation of the position of the target automated guided vehicle 7t, the position calculation system is premised on that a plurality of reflection sources 8 each being at known positions exist therearound. The position of at least one of the target automated guided vehicle 7t is calculated from a relative positional relation between the plurality of reflection sources 8 and the target automated guided vehicle 7t.

In more detail, as illustrated in FIGS. 2A and 2B, the laser measuring device 7L is mounted on the target automated guided vehicle 7t. Then, the target automated guided vehicle 7t, for each predetermined timing, for example being cyclic, radiates laser in a plurality of directions therearound from the laser measuring device 7L mounted on the own vehicle and detects each reflection light R of the radiated laser with the laser measuring device 7L. The automated guided vehicle 7 (target automated guided vehicle 7t) may be, for example, an automated guided forklift (AGF) and is configured to be capable of moving (travelling) in an unmanned manner toward a destination instructed by a management system 2s which manages automated operation of the automated guided vehicle 7. Here, the management system 2s provides an instruction (a route, a movement order, and the like) to the automated guided vehicle 7 not in operation to perform cargo conveying operation based on warehouse management data in the light of information of operational conditions of cargo conveying and the like informed from the respective automated guided vehicles 7 under control along with the calculated position information P and the like.

On the other hand, in operational circumstances in which the plurality of automated guided vehicles 7 travel (move), as illustrated in FIGS. 3 and 4 (same in FIGS. 6 and 7 described later), there exist a plurality of (N pieces of) the reflection sources 8 (hereinafter, stationary reflection sources 82) which are fixedly arranged at mutually different positions (positions having mutually different coordinates). Since coordinates (X, Y) are defined for each thereof, a distance between two points of the stationary reflection sources 82 can be calculated and triangulation using the two points and position calculation using a plurality of points can be performed. Each of the stationary reflection sources 82 are arranged at a stationary entity (a wall of the warehouse 9 in FIGS. 3 and 4 and FIGS. 6 and 7). The position information P indicating respective positions of the plurality of stationary reflection sources 82 is managed (stored) in a memory unit 4 (see FIG. 1) to be used for calculation of the position of the target automated guided vehicle 7t.

As described above, the position information of the stationary reflection sources 82 can be used for the position calculation. Then, owing to that the reflection light R reflected from a stationary reflection source 82 is specified from which one among the plurality of stationary reflection sources 82, the position information P of the specified stationary reflection source 82 can be obtained from the memory unit 4. Accordingly, for each specific timing described above, the position of the automated guided vehicle 7 having detected the reflection lights R reflected from a specific number C (N≥C≥2) of the stationary reflection sources 82 necessary for position calculation can be calculated, for example, with triangulation and the like.

In the embodiment illustrated in FIGS. 3 and 4 (same in FIGS. 6 and 7 described later), as the operational circumstances, the plurality of automated guided vehicles 7 exist in the warehouse 9 and the stationary reflection sources 82 are arranged at a plurality of positions on an inner wall face of the warehouse 9 being the stationary entity, resulting in that 14 (N=14) of the stationary reflection sources 82 are arranged in total. Further, the laser measuring device 7L is mounted on each of the automated guided vehicles 7 (five vehicles FL1 to FL5 in FIGS. 3 and 4) to calculate the positions of the respective automated guided vehicles 7. That is, all the automated guided vehicles 7 serve as target automated guided vehicles 7t, respectively. The position calculation system may calculate the positions of the plurality of target automated guided vehicles 7t in order or in series as described later.

Further, each of the laser measuring devices 7L is configured to be capable of radiating laser in a plurality of directions while rotating at a predetermined speed, as dividing 360 degrees by a specific number, for example, in 16 directions and receiving reflection lights R thereof. Then, the position of each of the automated guided vehicles 7 is calculated with triangulation and the like based on detection results of the reflection lights R of the laser radiated from the laser measuring device 7L mounted on the own vehicle respectively in the plurality of directions, for example, for each rotation.

However, in the operational circumstances described above, when an obstacle 92 such as a shelf and a stacked cargo arranged in the warehouse 9 or another automated guided vehicle 7 that disturbs straight travelling of laser exists between the target automated guided vehicle 7t and the stationary reflection source 82, the reflection light R reflected from the stationary reflection source 82 cannot be detected. As a result, position calculation cannot be performed of the target automated guided vehicle 7t that cannot detect the specific number C of the reflection sources 8. In such a case, another automated guided vehicle 7 provides support so that the position of the target automated guided vehicle 7t can be calculated even in the case that the specific number C of the stationary reflection sources 82 cannot be detected. That is, as illustrated in FIGS. 2A and 2B, at least a part of other automated guided vehicles 7 other than the target automated guided vehicle 7t has an entity being the reflection source 8 mounted thereon (hereinafter, a mounted reflection source 81) such as a reflection plate, so that the position calculation system performs position calculation of the target automated guided vehicle 7t while detecting the reflection light R reflected from the mounted reflection source 81 of another automated guided vehicle 7 as well as the reflection light R reflected from the stationary reflection source 82.

Here, in FIGS. 2A and 2B, the mounted reflection source 81 is arranged as rising from an upper part (uppermost part) or being hanged from an upper part of the automated guided vehicle 7 so as not to disturb laser radiated from the laser measuring device 7L as avoiding a path of the laser. Further, the mounted reflection source 81 is arranged at a position of different height within a range to be capable of measuring a distance between the laser measuring device 7L and the mounted reflection source 81 so as to eliminate a blind area of the laser measuring device 7L. Here, the mounted reflection source 81 illustrated in FIGS. 2A and 2B is a plate-shaped reflection plate. However, the shape thereof is not limited thereto.

In the following, description will be provided on the position calculation system described above.

As illustrated in FIG. 1, the position calculation system includes a managing unit 2 and a position calculating unit 3. The position calculation system may be configured, for example, of a computer and includes an unillustrated CPU (processor) and a storage device m being a memory and the like such as a ROM and a RAM. Owing to that the CPU executes operations (data calculation and the like) in accordance with instructions of a program loaded on a main memory device, the respective functional units described above are actualized.

In the following, description will be provided on configurations in the position calculation system.

In the following, description will be provided on an example in which the position calculating unit 3 is mounted on all the target automated guided vehicles 7t and the managing unit 2 is mounted on another apparatus other than the target automated guided vehicles 7t. That is, owing to that the automated guided vehicles 7 having the position calculating unit 3 mounted thereon serve as the target automated guided vehicles 7t respectively and the managing unit 2 and the position calculating unit 3 associates with each other through communication (wireless communication and the like), the position calculation system calculates a current position of the target automated guided vehicle 7t having the position calculating unit 3 mounted thereon (hereinafter, own position). In this case, the position calculating unit 3 may be actualized by a programmable logic controller (PLC) and the like.

The managing unit 2 is a functional unit configured to manage current positions of the respective automated guided vehicles 7. Specifically, owing to that the current positions of the respective automated guided vehicles 7 are communicated to the managing unit 2 each time the calculation is performed using the respective laser measuring devices 7L, the managing unit 2 may manage at least a latest current position of each of the plurality of automated guided vehicles 7. Here, the current position of each automated guided vehicle 7 may be an arbitrary position that is only required to be appropriate as the position of the automated guided vehicle 7, and for example, may be a position at which the laser measuring device 7L mounted on the automated guided vehicle 7 is arranged, a position of the mounted reflection source 81, or the like.

The position calculating unit 3 is a functional unit configured to calculate the position of the target automated guided vehicle 7t based on a detection result (measurement result) of the reflection lights R detected by the laser measuring device 7L mounted on the target automated guided vehicle 7t. Here, the reflection lights R are reflected respectively from the specific number C being two or more of reflection sources 8, the position information P of which is obtainable, and which exist at positions on mutually different directions viewing from the target automated guided vehicle 7t. For example, the laser measuring device 7L tries to radiate laser and receive the reflection light R thereof with respect to a plurality of directions for each predetermined timing. Then, the laser measuring device 7L stores, as the detection result, information to be required for the position calculation such as directions in which the reflection lights R are detected and distances to the reflection sources 8.

For example, in triangulation, due to detecting the reflection lights R reflected from at least three of the reflection sources 8 existing at mutually different positions, it is possible to calculate the position from the directions of the detected reflection lights R (alternatively, may be radiation directions) and a distance between the reflection sources 8 obtained from the position information P of the reflection sources 8 of the detected reflection lights R. When only two reflection lights R are detected, the position can be calculated by using a distance to each of the reflection sources 8 to be measured based on the detected reflection lights R and the detection directions or a distance between the reflection sources 8.

In this case, when the specific number C of the reflection sources 8 with the reflection lights R therefrom detected by the laser measuring device 7L include a mounted reflection source 81 mounted on another automated guided vehicle 7, the position calculating unit 3 obtains the position information P of the mounted reflection source 81 reflecting the reflection light R based on the current position managed by the managing unit 2, and calculates the position of the target automated guided vehicle 7t. That is, since the managing unit 2 manages the current positions of the respective automated guided vehicles 7, the position calculating unit 3 can obtain the position information P of the corresponding mounted reflection source 81 from the managing unit 2. Accordingly, when the position information P of the specific number C of the reflection sources 8 including the mounted reflection source 81 and the stationary reflection source 82 is obtained, the position calculating unit 3 can appropriately calculate the own position.

The above will be described with reference to FIGS. 3 and 4. In FIGS. 3 and 4, five of the automated guided vehicles 7 (FL1 to FL5) are each in a state that the corresponding own position is calculated based on the stationary reflection sources 82 in the warehouse 9. Positions in the warehouse 9 are managed with a coordinate system set in the warehouse 9. Specifically, in the coordinate system, the origin point is on the left-lower corner on the paper, and the plus direction of X coordinate is the rightward direction and the plus direction of Y coordinate is the upward direction therefrom on the paper. The position calculation system calculates the position coordinates (x, y) of the target automated guided vehicle 7t on the coordinate system. Here, the coordinate system may be two-dimensional or three-dimensional.

On this coordinate system, focusing attention on the automated guided vehicle 7 indicated by FL1, FL1 is positioned at coordinates (x1, y1) at time t0 as illustrated in FIG. 3, and moving rightward thereafter, FL1 is positioned at coordinates (x2, y2) at time t1 as illustrated in FIG. 4. Further, at time t0 (in FIG. 3), FL1 has detected the specific number C or more (in this case, four) of stationary reflection sources 82. However, at time t1 (in FIG. 4), since an obstacle 92 and another automated guided vehicle 7 exist between FL1 and the stationary reflection sources 82, only one stationary reflection source 82 (82i) is detected, so that the number of the detectable stationary reflection sources 82 is less than the specific number C in this situation.

In such a situation (at time t1) as illustrated in FIG. 4, since three of other automated guided vehicles 7 (in FIG. 4, FL2, FL4, and FL5) each having the mounted reflection source 81 detectable by the laser measuring device 7L of FL1 exist, the reflection lights R reflected from the respective mounted reflection sources 81 of the three automated guided vehicles 7 can be detected. That is, even at time t1, FL1 can detect reflection lights R reflected from one stationary reflection source 82 (82i) and the three mounted reflection sources 81 being four reflection sources 8 in total. Here, the current positions (position information P) of the three mounted reflection sources 81 can be obtained from the managing unit 2. Thus, since FL1 can acknowledge the position information P of the specific number C of the reflection sources 8, each position information P of which is known, FL1 can calculate the own position.

In the embodiment illustrated in FIG. 1, the position calculation system further includes a memory unit 4 configured to store the position information P of each of the stationary reflection sources 82. The memory unit 4 is formed in the storage device m. Further, the position calculating unit 3 includes a detection result obtaining unit 31 configured to obtain the detection result detected by the laser measuring device 7L mounted on the target automated guided vehicle 7t, a determining unit 32 configured to determine whether the reflection source 8 with the reflection light R detected by the laser measuring device 7L mounted on the own vehicle (i.e., the reflection source 8 detected by the target automated guided vehicle 7t) is the mounted reflection source 81 or the stationary reflection source 82, a reflection source position obtaining unit 33 to obtain the position information P of each reflection source 8 from the managing unit 2 or the memory unit 4 in accordance with the determination result of the determining unit 32, and a calculating unit 34 to calculate the position based on the obtained position information P of the specific number C of the reflection sources 8.

More specifically, in the embodiment illustrated in FIG. 1, the reflection source position obtaining unit 33 includes a first obtaining unit 33a to obtain, from the managing unit 2, the position information P of the reflection source 8 that has been determined to be the mounted reflection source 81 by the determining unit 32, and a second obtaining unit 33b to obtain, from the memory unit 4, the position information P of the reflection source 8 that has been determined to be the stationary reflection source 82 by the determining unit 32.

Here, the determining unit 32 determines the type (mounted reflection source 81, stationary reflection source 82) of the detected reflection source 8. For example, the determining unit 32 may determine whether the reflection source 8 of the reflection light R is the stationary reflection source 82, and determine that the reflection source 8 that has been determined not to be the stationary reflection source 82 is the mounted reflection source 81. Specifically, the determining unit 32 may determine whether the reflection light R detected as described above is reflected from the stationary reflection source 82 or from the mounted reflection source 81 based on a direction in which the reflection light R is received or a direction in which the radiation light before being reflected as the reflection light R is radiated. Here, the stationary reflection sources 82 are managed on the coordinates (X, Y) defined as known data fixed under the circumstances. In a case that the reflection light R of laser radiated in a direction, which does not cause the reflection light R reflected from the stationary reflection source 82 to be received, is received, it is determined that the reflection source 8 is the mounted reflection source 81. On the contrary, the determining unit 32 may determine whether the reflection source 8 is the mounted reflection source 81 and determine that the reflection source 8 that has been determined not to be the mounted reflection source 81 is the stationary reflection source 82.

Further, in the embodiment illustrated in FIG. 1, the position calculating unit 3 is configured to calculate the position of the target automated guided vehicle 7t using the detection result of the reflection light R reflected from the mounted reflection source 81 when the reflection lights R reflected respectively from the specific number C of the stationary reflection sources 82 have not been detected by the laser measuring device 7L mounted on the target automated guided vehicle 7t. That is, the position of the target automated guided vehicle 7t is calculated using, in a preferential manner, the detection result of the reflection light R reflected from the stationary reflection source 82. In a case that the position information P of a stationary reflection entity is more accurate than the position of the mounted reflection source 81 that moves, it is possible to improve calculation accuracy of the target automated guided vehicle 7t being the target.

Accordingly, the position calculating unit 3 can appropriately obtain the position information P of the specific number C of the reflection sources 8 and can calculate the position of the target automated guided vehicle 7t based on the position information P of the specific number C of the reflection sources 8.

Here, the present invention is not limited to the above-mentioned embodiment. In the embodiment illustrated in FIG. 1, the memory unit 4 is arranged at the target automated guided vehicle 7t. However, in some other embodiments, the memory unit 4 may be arranged at another apparatus other than the target automated guided vehicle 7t, communicable with the position calculating unit 3 via a communication network such as the management system 2s at which the managing unit 2 is arranged, for example. Further, the detection result of the reflection light R reflected from the stationary reflection source 82 may not be used in a preferential manner for position calculation of the target automated guided vehicle 7t. Due to using the detection result of the reflection source 8 with the reflection light R therefrom detected more appropriately, the detection result of the mounted reflection source 81 detected at the same period may be used even when the specific number C of the stationary reflection sources 82 have been detected.

Further, in some other embodiments, the managing unit 2 and the position calculating unit 3 may be mounted on the target automated guided vehicle 7t. In this case, the position information P of other automated guided vehicles 7 required for calculation of the own position may be obtained by that the managing unit 2 is mounted, for example, on one of the automated guided vehicles 7 and the rest of the automated guided vehicles 7 communicate with the automated guided vehicle 7. Alternatively, the managing unit 2 and the position calculating unit 3 may be arranged at the management system 2s. Here, the management system 2s may be configured to obtain the detection result of the reflection light R by the laser measuring device 7L from each automated guided vehicle 7 and to inform the calculated position of the target automated guided vehicle 7t.

According to the configuration described above, the reflection source 8 (mounted reflection source 81) is mounted on each of the automated guided vehicles 7. When the specific number C of the reflection sources 8 detected around and by the laser measuring device 7L mounted on the automated guided vehicle 7 being the target of position calculation include the mounted reflection source 81 of another automated guided vehicle 7, position calculation of the target automated guided vehicle 7t is performed, after the position information P of the mounted reflection source 81 that has been detected is obtained based on management information of the managing unit 2 (current information), based on the position information P of the specific number C of the reflection sources 8 including the known position information P of the mounted reflection source 81. That is, in the position calculation system, it is configured that position calculation of the target automated guided vehicle 7t is assisted by another automated guided vehicle 7. According to the above, even in a case that the specific number C of the stationary reflection sources 82 cannot be detected by the laser measuring device 7L of the target automated guided vehicle 7t, position calculation of the target automated guided vehicle 7t can be performed by using the detection result of the mounted reflection source 81 of another automated guided vehicle 7 detected by the target automated guided vehicle 7t (laser measuring device 7L).

Figure 5:
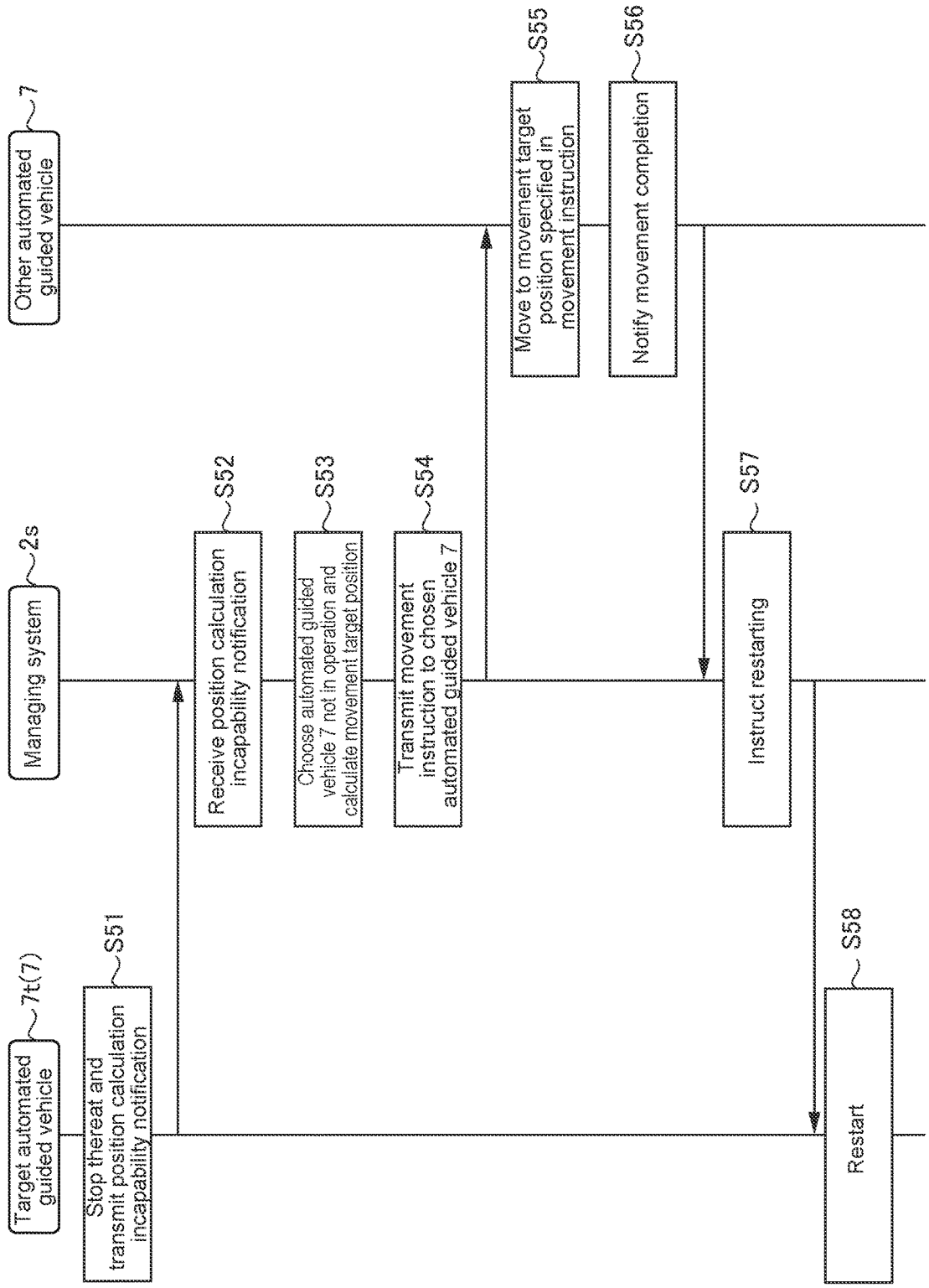
FIG. 5 is a sequence diagram of position calculation assistance using an automated guided vehicle not in operation according to an embodiment of the present invention.
Figure 6:
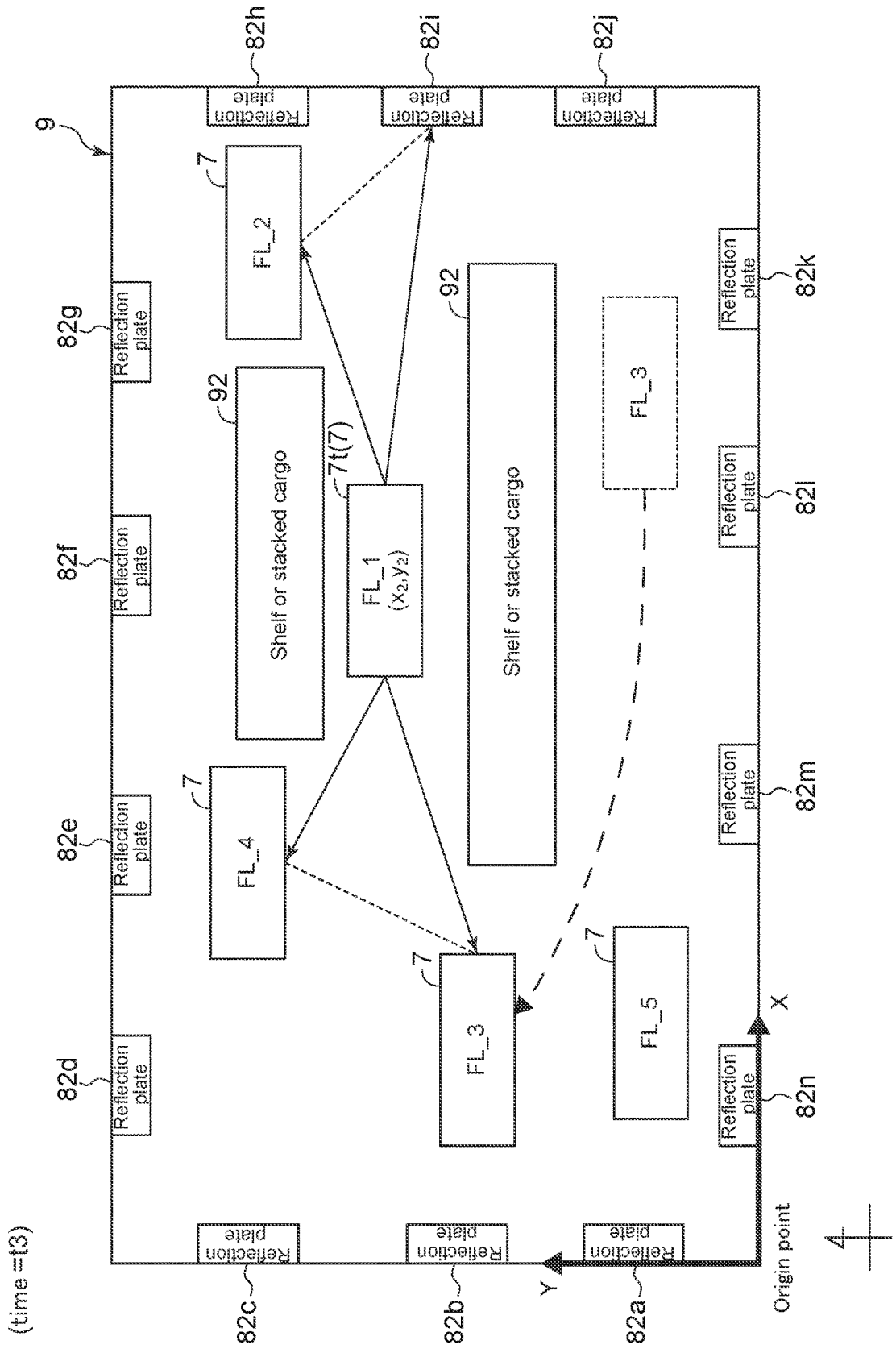
FIG. 6 is a view illustrating a situation of the position calculation assistance with an automated guided vehicle not in operation according to an embodiment of the present invention.

Next, description will be provided on a case, in the embodiment described above, that the number of the reflection sources 8 capable of being detected by the target automated guided vehicle 7t does not reach the specific number C even including the mounted reflection sources 81 with reference to FIGS. 5 and 6. FIG. 5 is a sequence diagram of position calculation assistance using the automated guided vehicle 7 not in operation according to an embodiment of the present invention. FIG. 6 is a view illustrating a situation of the position calculation assistance with the automated guided vehicle 7 not in operation according to an embodiment of the present invention.

In the embodiment described above, position calculation of each of the target automated guided vehicles 7t can be continued by utilizing the mounted reflection sources 81 of the other automated guided vehicles 7. Here, each of the automated guided vehicles 7 move under the operational circumstances such as in the warehouse 9 in accordance with instructions separately provided by the management system 2s. Accordingly, even in the embodiment described above, there may be a case that the target automated guided vehicle 7t cannot detect the specific number C of the reflection sources 8 even counting on both the mounted reflection source 81 and the stationary reflection source 82 because of absence of the other automated guided vehicles 7 as well as absence of the stationary reflection sources 82 at appropriate positions around the target automated guided vehicle 7t resulting from the influence of the obstacle 92 and the like.

Therefore, in some embodiments, as illustrated in FIG. 1, the position calculation system having the abovementioned configuration may further include a first instructing unit 51 (movement instructing unit) configured to instruct the other automated guided vehicle 7 to move to a position at which the mounted reflection source 81 is capable of being detected by the laser measuring device 7L mounted on the target automated guided vehicle 7t, when the number of the reflection sources 8 with the reflection lights R therefrom detected by the laser measuring device 7L mounted on the target automated guided vehicle 7t does not reach the specific number C. That is, when the number of the reflection sources 8 detected by the target automated guided vehicle 7t does not reach the specific number C, the position calculation system moves the other automated guided vehicle 7 to a position to be capable of being detected.

Specifically, as illustrated in FIG. 5, the target automated guided vehicle 7t may be configured to stop moving and notify the management system 2s of position calculation incapability (position calculation incapability notification) in a case that position calculation of the target automated guided vehicle 7t cannot be performed such as a case that the position calculating unit 3 cannot obtain the position information P of the specific number C of the reflection sources 8 (S51). Here, the automated guided vehicle 7 may not perform at least one of the movement stopping and the position calculation incapability notification. In this case, since the results of the position calculation to be executed cyclically are not notified to the managing unit 2, the management system 2s may execute the following processes while regarding the position calculation as being incapable when absence of notification of the position calculation result continues for specific times (once or more).

The management system 2s is configured to choose the automated guided vehicle 7 not in operation based on the management information managed by the management system 2s and to calculate a movement target position at which detection of the mounted reflection source 81 of the other automated guided vehicle 7 can be performed by the target automated guided vehicle 7t that has transmitted the position calculation incapability notification (S53 in FIG. 5), when the position calculation incapability notification is received (S52 in FIG. 5). Specifically, the management system 2s may choose, based on warehouse management data, the automated guided vehicle 7 being in waiting state such as a state that operation of cargo conveying and the like is not allocated at that time. Further, the movement target position may be determined based on information of positions of shelves and stacked cargos included in the warehouse management data and the latest position information of the stopped target automated guided vehicle 7t.

Further, the management system 2s is configured to cause the first instructing unit 51 to instruct the chosen automated guided vehicle 7 not in operation to move to the movement target position (S54 in FIG. 5). Further, the automated guided vehicle 7 having received the movement instruction starts moving toward the movement target position specified in the movement instruction (S55 in FIG. 5). Then, when movement to the movement target position is completed, the management system 2s is notified of movement completion (S56 in FIG. 5).

Further, as illustrated in FIG. 5, after the management system 2s informs the target automated guided vehicle 7t of that the automated guided vehicle 7 having received the movement instruction has completed movement to the movement target position, the management system 2s may instruct to restart processes (S57 in FIG. 5). When the movement completion notification is received, the target automated guided vehicle 7t may restart position calculation (S58 in FIG. 5). Alternatively, when it is configured that only the position calculation is continued even after the target automated guided vehicle 7t stops movement, since position calculation can be executed due to detecting the automated guided vehicle 7 having moved to the movement target position, the processes for the movement may be restarted.

According to the above, as illustrated in FIG. 6, for position calculation, the target automated guided vehicle 7t (FL1 in FIG. 6) becomes capable of detecting, by the laser measuring device 7L mounted on the own vehicle, the mounted reflection source 81 of the other automated guided vehicle 7 (FL3 in FIG. 6) having moved to the movement target position. In the embodiment illustrated in FIG. 6, FL1 has been in a situation of being incapable of detecting the specific number C of the reflection sources 8 even counting the mounted reflection source 81 and the stationary reflection source 82. Then, owing to that FL3 has moved to the movement target position at time t2, FL1 becomes capable of detecting the specific number C of the reflection sources 8 (in FIG. 6, four in total as being FL2, FL3, FL4, and the stationary reflection source 82i). Thus, it is possible to detect the specific number C of the reflection sources 8 by the target automated guided vehicle 7t.

Here, even after movement of the other automated guided vehicle 7 to the movement target position is completed, for some reason such that the obstacle 92 is higher than expected, there may be a case that position calculation of the target automated guided vehicle 7t still cannot be performed by the position calculation system. In preparation for such a case, when the specific number C of the reflection sources 8 cannot be detected after the automated guided vehicle 7 having received the movement instruction completed movement to the movement target position, the target automated guided vehicle 7t may notify again the managing unit 2 of the position calculation incapability notification to adjust the movement target position for the automated guided vehicle not in operation. Alternatively, when the target automated guided vehicle 7t is configured to notify the management system 2s of the restart completion notification as being capable of detecting the specific number C of the reflection sources 8, the abovementioned adjustment of the movement target position may be performed when the notification is not provided.

According to the configuration described above, when the reflection lights R reflected from the specific number C of the reflection sources 8 cannot be detected by the laser measuring device 7L mounted on the target automated guided vehicle 7t, the target automated guided vehicle 7t is caused to be capable of detecting the reflection lights R reflected from the specific number C of the reflection sources 8 by causing the other automated guided vehicle 7, for example, not in operation to move. Accordingly, it is possible to increase the possibility that the target automated guided vehicle 7t detects the specific number C of the reflection sources 8 and to enhance assistance for the position calculation of the target automated guided vehicle 7t by the other automated guided vehicle 7.

Further, in some embodiments, the position calculation system may further include a second instructing unit 52 configured to instruct the target automated guided vehicle 7t to stand by for moving or change a position calculation method, when the number of the reflection sources 8 with the reflection lights R therefrom detected by the laser measuring device 7L mounted on the target automated guided vehicle 7t does not reach the specific number C.

The stand-by instruction from the second instructing unit 52 may be provided, as described above, when the management system 2s detects that the position calculation cannot be performed by the target automated guided vehicle 7t or when thereafter another automated guided vehicle 7, such as the automated guided vehicle 7 not in operation capable of moving to the movement target position, cannot be chosen. Accordingly, even in a case that the target automated guided vehicle 7t is not configured to automatically stop when the position calculation of the target automated guided vehicle 7t cannot be performed by the position calculating unit 3, the target automated guided vehicle 7t can be prevented from continuing movement. Further, even in a case of being configured to automatically stop, it is possible to achieve reduction of power consumption and the like owing to that the target automated guided vehicle 7t having received the stand-by instruction stops position calculation as well.

On the other hand, the instruction to change the position calculation method (position calculation logic) by the second instructing unit 52 is premised on that the position calculation system (position calculating unit 3) is configured to be capable of performing the position calculation with a plurality of methods. For example, normally, the position information P of at least three, such as being three or four, of the reflection sources 8 is required to perform coordinate calculation using triangulation. However, when the position information P of only two of the reflection sources 8 is obtained, it is possible to switch to a mode in which the position calculation is performed based on the distances and directions from the target automated guided vehicle 7t and the respective two reflection sources 8 and the distance between the two reflection sources 8 owing to that the laser measuring device 7L mounted on the own vehicle measures the distance to the reflection sources 8.

According to the configuration described above, when the reflection lights R reflected from the specific number C of the reflection sources 8 cannot be detected by the laser measuring device 7L mounted on the target automated guided vehicle 7t, the target automated guided vehicle 7t is instructed to stand by for moving or change a position calculation method (position calculation logic). In a case, for example, that another automated guided vehicle 7 cannot be moved to a position to be capable of being detected by the target automated guided vehicle 7t, the stand-by instruction can prevent the target automated guided vehicle 7t from moving without the position thereof acknowledged. Further, due to, for example, switching to a method requiring less number than the specific number C by changing the position calculation method, the position calculation of the target automated guided vehicle 7t can be continued.

Figure 7:
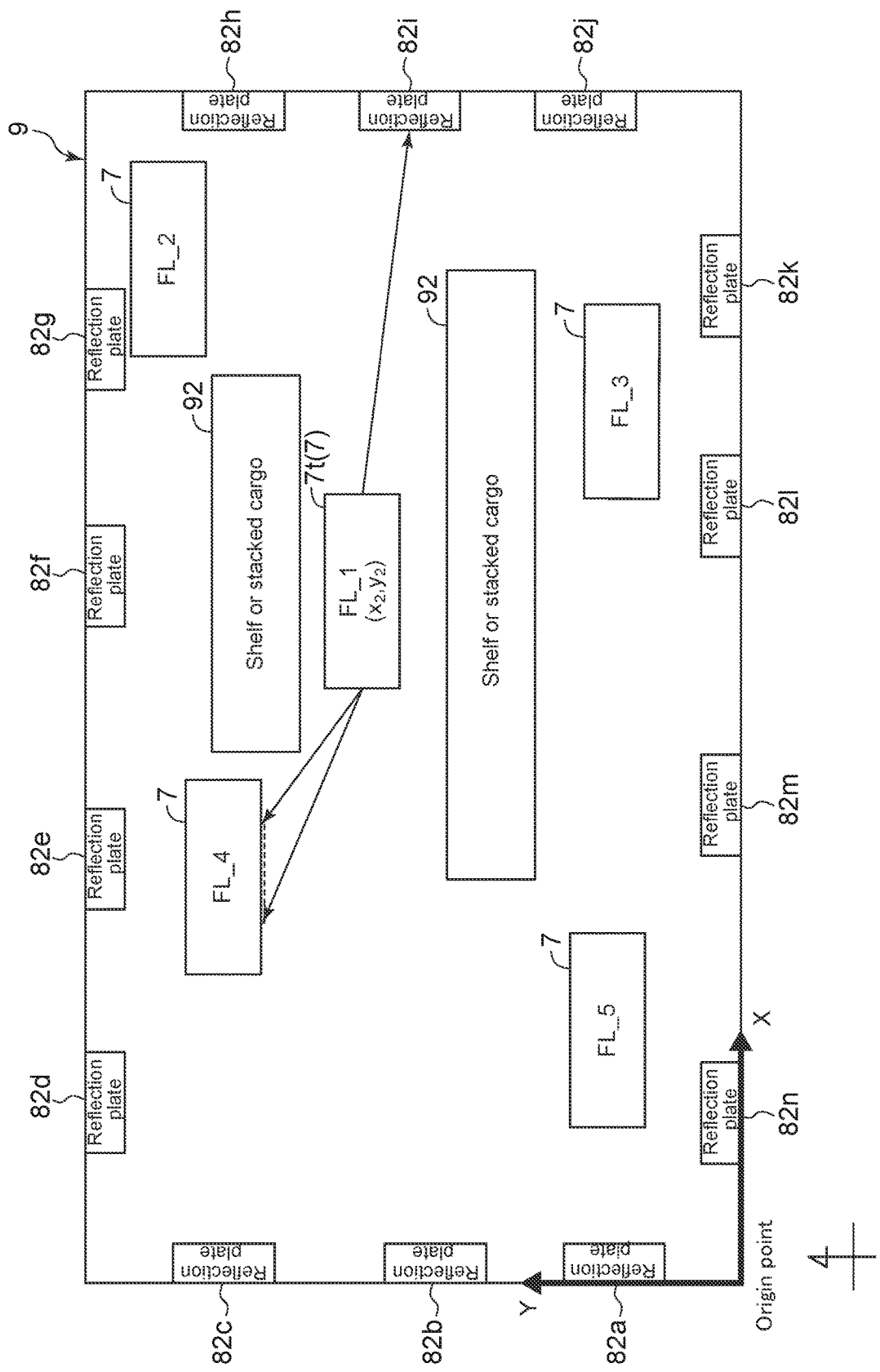
FIG. 7 is a view illustrating a case that position calculation is performed using a plurality of reflection lights reflected from a plurality of reflection sources mounted on an automated guided vehicle according to an embodiment of the present invention.

Next, description will be provided on an embodiment regarding the automated guided vehicle 7 including the mounted reflection source 81. FIG. 7 is a view illustrating a case that the position calculation is performed using a plurality of reflection lights R reflected from a plurality of the reflection sources 8 mounted on the automated guided vehicle 7 according to an embodiment of the present invention.

In the above description, the automated guided vehicle 7 is mounted with the reflection source 8 such as a reflection plate capable of reflecting laser radiated from the laser measuring device 7L mounted on the target automated guided vehicle 7t toward the laser measuring device 7L. Here, as illustrated in FIGS. 2A and 2B, when the mounted reflection sources 81 are mounted on the automated guided vehicle 7 respectively at mutually different positions (coordinates), since the laser radiated from the target automated guided vehicle 7t is reflected respectively from the plurality (in FIGS. 2A and 2B, two) of the mounted reflection sources 81, the mounted reflection sources 81 can serve as separate reflection sources 8.

In the embodiment described in FIGS. 2A and 2B, a rod-shaped support member 73 extending in the vehicle width direction is arranged at the vehicle body of the automated guided vehicle 7. Here, owing to that the mounted reflection sources 81 are arranged respectively at both ends of the support member 73, the position coordinates of the two mounted reflection sources 81 are different from each other. Here, the managing unit 2 may take the position coordinates of the mounted reflection source 81 as the current position of the automated guided vehicle 7 or a predetermined position in the vehicle body as the current position of the automated guided vehicle 7. In the later case, the relative position of the mounted reflection sources 81 with respect to the predetermined position is geometrically known, the position information P of the mounted reflection source 81 is calculated by either the managing unit 2 or the position calculating unit 3 using the relative position, the direction of the reflection light R, and the like. Accordingly, it is possible to obtain more easily the specific number C of the reflection sources 8.

Further, as illustrated in FIGS. 2A and 2B, when each of the mounted reflection sources 81 has a shape elongated in the gravity direction (height direction), owing to that the reflection lights R reflected from an upper part and a lower part of the single mounted reflection source 81, the single mounted reflection source 81 can serve as two reflection sources 8. Then, when the reflection lights R reflected from different positions of the single mounted reflection source 81 such as an upper part and a lower part of a reflection plate are to be detected, at least two reflection lights R can be detected from the single automated guided vehicle 7. In this case, in the embodiment of FIGS. 2A and 2B, since the automated guided vehicle 7 includes two reflection plates (mounted reflection sources 81) having mutually different XY coordinates as being elongated in the gravity direction, it is possible to detect four reflection lights R in total reflected from the single automated guided vehicle 7 by detecting the reflection lights R reflected respectively from the upper part and the lower part of the reflection plates. Accordingly, it is possible to obtain more easily the specific number C of the reflection sources 8.

Figure 8:
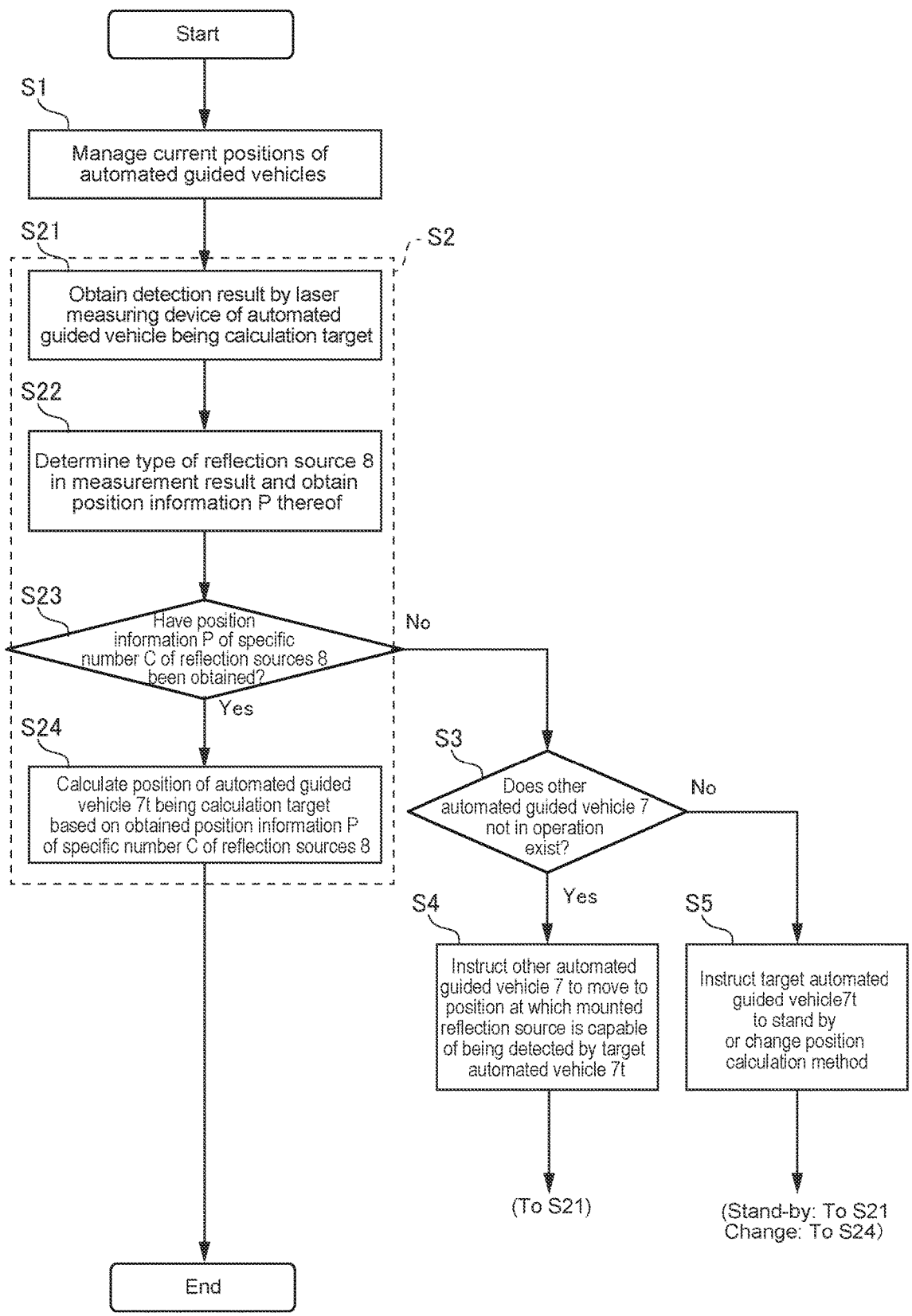
FIG. 8 is a view illustrating a position calculation method according to an embodiment of the present invention.

In the following, description will be provided on the position calculation method corresponding to the processes to be executed by the position calculation system with reference to FIG. 8. FIG. 8 is a view illustrating the position calculation method according to an embodiment of the present invention.

The position calculation method is a method for calculating the position of the target automated guided vehicle 7t as described above. As illustrated in FIG. 8, the position calculation method includes a managing step (S1) and a position calculating step (S2). These steps will be described in the order of steps in FIG. 8. The flow of FIG. 8 may be executed for each specific timing such as being cyclic.

In step S1 in FIG. 8, the managing step is executed. The managing step (S1) is a step of managing a current position of each of the plurality of automated guided vehicles 7. The managing step (S1) is similar to the abovementioned processes to be executed by the managing unit 2 and detailed description thereof is not repeated.

In step S2 in FIG. 8, the position calculating step is executed. The position calculating step (S2) is a step of calculating a position of the target automated guided vehicle 7t based on the detection result (measurement result), detected by the laser measuring device 7L mounted on the target automated guided vehicle 7t, of detecting each reflection light reflected from the specific number C being two or more of the reflection sources 8, position information of which is obtainable, existing at positions on mutually different directions viewing from the target automated guided vehicle 7t. Specifically, in the position calculating step, when the specific number C of the reflection sources 8 with the reflection light R therefrom detected include the mounted reflection source 81 mounted on another automated guided vehicle 7, the position information P of the mounted reflection source 81 having reflected the reflection light R is obtained based on the current position managed by the managing unit 2 and the position of the target automated guided vehicle 7t is calculated. Thereafter, the calculated position information P is stored and managed (returned to S1).

The position calculating step (S2) is similar to the abovementioned processes to be executed by the position calculating unit 3 and detailed description thereof is not repeated. Here, in some embodiments, as illustrated in FIG. 8, the position calculating step (S2) may include a detection result obtaining step (S21) of obtaining the detection result detected by the laser measuring device 7L mounted on the target automated guided vehicle 7t, a determining step of determining (a type) whether the reflection source 8 with the reflection light R detected by the laser measuring device 7L is the mounted reflection source 81 or the stationary reflection source 82, a reflection source position obtaining step (S22) of obtaining, in accordance with the determination result in the determining step, the position information P based on the current position managed in the managing step (S1) or the position information P of each reflection source 8 previously stored in the memory unit 4 and the like, and a calculating step (S24) of calculating the position based on the obtained position information P of the specific number C of the reflection sources 8. The detection result obtaining step (S21), the determining step, the reflection source position obtaining step (S22), and the calculating step (S24) are similar to the processes described above to be executed by the detection result obtaining unit 31, the determining unit 32, the reflection source position obtaining unit 33, and the calculating unit 34, and detailed description thereof is not repeated.

In the embodiment illustrated in FIG. 8, for each predetermined timing, the measurement result by the laser measuring device 7L of the target automated guided vehicle 7t is obtained in step S21 subsequent to step S1, and in step S22, the type of the reflection source 8 with the reflection light R included in the measurement result detected is determined and the position information P thereof is obtained. Subsequently, when the position information P of the specific number C of the reflection sources 8 is determined to have been detected in step S23, the position of the target automated guided vehicle 7t is calculated in step S24. However, the present invention is not limited thereto. In some other embodiments, it is determined, after the detection result obtaining step (S21), whether the reflection lights R reflected from the specific number C of the reflection sources 8 have been detected, and the reflection source position obtaining step (S22) and the calculating step (S24) may be executed when the reflection lights R have been detected.

In some embodiments, as illustrated in FIG. 8, the position calculation method may further include a first instructing step (S4) of instructing the other automated guided vehicle 7 to move to a position at which the mounted reflection source 81 is capable of being detected by the laser measuring device 7L mounted on the target automated guided vehicle 7t, when the number of the reflection sources 8 with the reflection lights R therefrom detected by the laser measuring device 7L mounted on the target automated guided vehicle 7t does not reach the specific number C. The first instructing step (S4) is similar to the abovementioned processes to be executed by the first instructing unit 51 and detailed description thereof is not repeated.

Further, in some embodiments, as illustrated in FIG. 8, the position calculation method may further include a second instructing step (S5) of instructing the target automated guided vehicle 7t to stand by for moving or change a position calculation method, when the number of the reflection sources 8 with the reflection lights R therefrom detected by the laser measuring device 7L mounted on the target automated guided vehicle 7t does not reach the specific number C. The second instructing step (S5) is similar to the abovementioned processes to be executed by the second instructing unit 52 and detailed description thereof is not repeated.

In the embodiment illustrated in FIG. 8, when the position of the target automated guided vehicle 7t cannot be calculated owing to such that the specific number C of the position information P cannot be obtained in step S23, it is determined whether another automated guided vehicle 7 not in operation exists in step S3. When such an automated guided vehicle 7 has been chosen, the first instructing step (S4) is executed. That is, the automated guided vehicle 7 not in operation is instructed to move to a position at which the target automated guided vehicle 7t is capable of detecting the automated guided vehicle 7. On the contrary, when another automated guided vehicle 7 not in operation does not exist in step S3, the target automated guided vehicle 7t is instructed to stand by for moving or change a position calculation method in step S5.

Not limited to the embodiments described above, the present invention includes modifications of the embodiments and appropriate combinations thereof.

The invention claimed is:

1. A position calculation system to calculate a position of a target automated guided vehicle among a plurality of automated guided vehicles each mounted with a laser measuring device, comprising:

a non-transitory memory configured to store a program; and a hardware processor configured to execute the program and control the position calculation system to operate as:

a managing unit configured to manage a current position of each of the plurality of automated guided vehicles; and a position calculating unit configured to calculate a position of the target automated guided vehicle based on a detection result, detected by the laser measuring device mounted on the target automated guided vehicle, of detecting each reflection light reflected from a specific number being two or more of reflection sources, position information of which is obtainable, existing at positions on mutually different directions viewing from the target automated guided vehicle, wherein, when the specific number of reflection sources with the reflection light therefrom detected include a mounted reflection source mounted on another automated guided vehicle other than the target automated guided vehicle, the position calculating unit obtains the position information of the mounted reflection source based on the current position managed by the managing unit, and calculates a position of the target automated guided vehicle, wherein the position calculating unit includes:

a detection result obtaining unit configured to obtain the detection result detected by the laser measuring device mounted on the target automated guided vehicle;

a determining unit configured to determine whether the reflection source with the reflection light detected is the mounted reflection source or a stationary reflection source installed on a position-fixed stationary entity; and a first obtaining unit configured to obtain, from the managing unit, the position information of the reflection source that has been determined to be the mounted reflection source by the determining unit, and wherein the position calculating unit calculates a position of the target automated guided vehicle using the detection result of the reflection light reflected from the mounted reflection source when the reflection light reflected from each of the specific number of stationary reflection sources is not detected by the laser measuring device mounted on the target automated guided vehicle.

2. The position calculation system according to claim 1 wherein the hardware processor is further configured to control the position calculation system to operate as a memory unit configured to store the position information of each of a plurality of the stationary reflection sources installed at mutually different positions, wherein the position calculating unit further includes a second obtaining unit configured to obtain, from the memory unit, the position information of the reflection source that has been determined to be the stationary reflection source by the determining unit.

3. A position calculation system to calculate a position of a target automated guided vehicle among a plurality of automated guided vehicles each mounted with a laser measuring device, comprising:

a non-transitory memory configured to store a program; and a hardware processor configured to execute the program and control the position calculation system to operate as:

a managing unit configured to manage a current position of each of the plurality of automated guided vehicles; and a position calculating unit configured to calculate a position of the target automated guided vehicle based on a detection result, detected by the laser measuring device mounted on the target automated guided vehicle, of detecting each reflection light reflected from a specific number being two or more of reflection sources, position information of which is obtainable, existing at positions on mutually different directions viewing from the target automated guided vehicle, wherein, when the specific number of reflection sources with the reflection light therefrom detected include a mounted reflection source mounted on another automated guided vehicle other than the target automated guided vehicle, the position calculating unit obtains the position information of the mounted reflection source based on the current position managed by the managing unit, and calculates a position of the target automated guided vehicle, and wherein the hardware processor is further configured to control the position calculation system to operate as a first instructing unit configured to instruct the other automated guided vehicle to move to a position at which the reflection light reflected from the mounted reflection source is capable of being detected by the laser measuring device mounted on the target automated guided vehicle, when the number of the reflection sources with the reflection light therefrom detected by the laser measuring device mounted on the target automated guided vehicle does not reach the specific number.

4. The position calculation system according to claim 1, wherein the hardware processor is further configured to control the position calculation system to operate as a second instructing unit configured to instruct the target automated guided vehicle to stand by for moving or change a position calculation method, when the number of the reflection sources with the reflection light therefrom detected by the laser measuring device mounted on the target automated guided vehicle does not reach the specific number.

5. A position calculation method to calculate a position of a target automated guided vehicle among a plurality of automated guided vehicles each mounted with a laser measuring device, comprising:

a managing step of managing a current position of each of the plurality of automated guided vehicles; and a position calculating step of calculating a position of the target automated guided vehicle based on a detection result, detected by the laser measuring device mounted on the target automated guided vehicle, of detecting each reflection light reflected from a specific number being two or more of reflection sources, position information of which is obtainable, existing at positions on mutually different directions viewing from the target automated guided vehicle, wherein the position calculating step includes obtaining the position information of the mounted reflection source based on the current position managed by the managing step, and calculating a position of the target automated guided vehicle, when the specific number of reflection sources with the reflection light therefrom detected include a mounted reflection source mounted on another automated guided vehicle other than the target automated guided vehicle, wherein the position calculating step includes:

a detection result obtaining step of obtaining the detection result detected by the laser measuring device mounted on the target automated guided vehicle;

a determining step of determining whether the reflection source with the reflection light detected is the mounted reflection source or a stationary reflection source installed on a position-fixed stationary entity;

a first obtaining step of obtaining, from the managing step, the position information of the reflection source that has been determined to be the mounted reflection source by the determining step, and wherein the position calculating step includes calculating a position of the target automated guided vehicle using the detection result of the reflection light reflected from the mounted reflection source when the reflection light reflected from each of the specific number of stationary reflection sources is not detected by the laser measuring device mounted on the target automated guided vehicle.

6. An automated guided vehicle, comprising one or more mounted reflection sources capable of reflecting, toward a laser measuring device, laser radiated from the laser measuring device mounted on an automated guided vehicle being a target of position calculation for the position calculation system according to claim 1.

7. The position calculation system according to claim 3, wherein the hardware processor is further configured to control the position calculation system to operate as a second instructing unit configured to instruct the target automated guided vehicle to stand by for moving or change a position calculation method, when the number of the reflection sources with the reflection light therefrom detected by the laser measuring device mounted on the target automated guided vehicle does not reach the specific number.

8. An automated guided vehicle, comprising one or more mounted reflection sources capable of reflecting, toward a laser measuring device, laser radiated from the laser measuring device mounted on an automated guided vehicle being a target of position calculation for the position calculation system according to claim 3.

9. A position calculation method to calculate a position of a target automated guided vehicle among a plurality of automated guided vehicles each mounted with a laser measuring device, comprising:

a managing step of managing a current position of each of the plurality of automated guided vehicles; and a position calculating step of calculating a position of the target automated guided vehicle based on a detection result, detected by the laser measuring device mounted on the target automated guided vehicle, of detecting each reflection light reflected from a specific number being two or more of reflection sources, position information of which is obtainable, existing at positions on mutually different directions viewing from the target automated guided vehicle, wherein the position calculating step includes obtaining the position information of the mounted reflection source based on the current position managed by the managing step, and calculating a position of the target automated guided vehicle, when the specific number of reflection sources with the reflection light therefrom detected include a mounted reflection source mounted on another automated guided vehicle other than the target automated guided vehicle, and wherein, the position calculation method further comprises a first instructing step of instructing the other automated guided vehicle to move to a position at which the reflection light reflected from the mounted reflection source is capable of being detected by the laser measuring device mounted on the target automated guided vehicle, when the number of the reflection sources with the reflection light therefrom detected by the laser measuring device mounted on the target automated guided vehicle does not reach the specific number.

* * * * *